United States Patent
Suchta et al.

(10) Patent No.: US 10,550,781 B2
(45) Date of Patent: Feb. 4, 2020

(54) SYSTEMS AND METHODS FOR PARTICULATE FILTER LOAD ESTIMATION

(71) Applicant: Ford Global Technologies, LLC, Dearborn, MI (US)

(72) Inventors: Nikodem Suchta, Rochester Hills, MI (US); Jacqueline A. Lymburner, Carleton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 86 days.

(21) Appl. No.: 15/702,579

(22) Filed: Sep. 12, 2017

(65) Prior Publication Data
US 2019/0078524 A1    Mar. 14, 2019

(51) Int. Cl.
| F02D 41/02 | (2006.01) |
| F01N 3/023 | (2006.01) |
| F01N 11/00 | (2006.01) |
| B60W 20/16 | (2016.01) |
| B01D 46/44 | (2006.01) |
| B01D 46/00 | (2006.01) |

(52) U.S. Cl.
CPC .......... *F02D 41/029* (2013.01); *B60W 20/16* (2016.01); *F01N 3/023* (2013.01); *F01N 11/002* (2013.01); *F01N 11/007* (2013.01); *B01D 46/0063* (2013.01); *B01D 46/446* (2013.01); *B01D 46/448* (2013.01); *B01D 2279/30* (2013.01); *F01N 2550/04* (2013.01); *F01N 2900/1606* (2013.01); *Y10S 903/903* (2013.01)

(58) Field of Classification Search
CPC combination set(s) only.
See application file for complete search history.

(56) References Cited

U.S. PATENT DOCUMENTS

| 7,395,661 | B2 | 7/2008 | Iida |
| 8,146,351 | B2 | 4/2012 | Li et al. |
| 8,181,452 | B2 | 5/2012 | Bidner et al. |
| 8,424,295 | B2 | 4/2013 | Bidner et al. |
| 8,478,565 | B2 | 7/2013 | Ardanese et al. |
| 2012/0198824 | A1* | 8/2012 | Nishioka ............... F01N 3/0253 60/297 |
| 2012/0297750 | A1* | 11/2012 | Sun .......................... F01N 11/00 60/274 |
| 2012/0297751 | A1* | 11/2012 | Sun .......................... F01N 9/002 60/274 |
| 2014/0338434 | A1* | 11/2014 | Sun ...................... F02D 41/1448 73/114.75 |
| 2015/0068195 | A1* | 3/2015 | Lauer ..................... F01N 13/009 60/274 |
| 2015/0369154 | A1* | 12/2015 | Garombo ................ F01N 9/002 60/274 |

(Continued)

*Primary Examiner* — Rami Khatib
(74) *Attorney, Agent, or Firm* — Geoffrey Brumbaugh; McCoy Russell LLP

(57) ABSTRACT

Methods and systems are provided for monitoring a change in exhaust particulate filter (PF) soot load during an engine non-combusting condition. In one example, a method may include, responsive to a higher than threshold PF temperature immediately prior to an engine shutdown, estimating a rate of soot burn when the engine is no longer combusting, and estimating a soot load on the PF during and at an onset of immediately subsequent engine start based in part on the rate of soot burn.

8 Claims, 3 Drawing Sheets

(56) References Cited

U.S. PATENT DOCUMENTS

2016/0053648 A1\* 2/2016 Iojoiu ................... F02D 41/029
                                                             60/274
2017/0037786 A1\* 2/2017 Fabien ...................... F02D 9/02
2018/0202342 A1\* 7/2018 Pannuzzo ............... F01N 9/002

\* cited by examiner

SYSTEMS AND METHODS FOR PARTICULATE FILTER LOAD ESTIMATION

FIELD

The present description relates generally to methods and systems for estimating a change in exhaust particulate filter soot load during an engine non-combusting condition.

BACKGROUND/SUMMARY

Engine combustion using gasoline fuel may generate particulate matter (PM) (such as soot and aerosols) that may be exhausted to the atmosphere. To enable emissions compliance, particulate filters (PF) may be included in the engine exhaust to filter out exhaust PMs before releasing the exhaust gas to the atmosphere. Such devices may be periodically or opportunistically regenerated during operation of an engine to decrease the amount of trapped particulate matter. In order to effectively schedule PF regeneration, the soot load on the PF is desired to be measured at the onset and during a drive cycle.

Various approaches are provided for accurately estimating soot load on the PF. In one example, as shown in U.S. Pat. No. 8,478,565, Ardanese et al. disclose a method for monitoring soot load on the PF during engine operations while taking into account inefficiency of active regeneration processes. The soot load on the PF is monitored based on operating conditions including differential exhaust pressure across the PF, exhaust temperature, time at which the exhaust temperature is measured, oxygen level, number of previous consecutive incomplete regenerations, and driving mode.

However, the inventors herein have recognized potential disadvantages with the above approach. As one example, in order to monitor soot load on the PF during engine operations, an accurate estimation of soot load at the onset of the drive cycle is desired. Oxidation of accumulated soot on the PF may occur during engine non-combusting conditions, and this oxidation of soot is not accounted for in prior approaches for soot load estimation resulting in inaccurate soot load estimates. If the initial soot load estimate at the onset of a drive cycle is erroneous, PF soot load estimated during the drive cycle may not be accurate, thereby increasing the possibility of reaching higher than desired exhaust backpressure levels which may adversely affect engine output. PF regenerations may be scheduled based on inaccurate soot loads which may result in increased frequency of PF regenerations with a resultant loss in fuel economy. Also, deceleration fuel shut-off (DFSO) events may be altered to inaccurately schedule PF regenerations which may reduce fuel efficiency.

In one example, the issues described above may be addressed by a method comprising: estimating soot loading of a particulate filter (PF), coupled to an exhaust of an engine, during an engine shutdown period to account for soot oxidation during the engine shut down period based on a temperature of the PF at shutdown and a corresponding temperature profile of the PF during the engine shutdown period. In this way, by estimating an amount of soot burned during an engine non-combusting condition, the soot load at the beginning of an immediately subsequent engine combusting condition may be accurately estimated.

As one example, immediately prior to an engine shutdown, an initial PF temperature and an initial soot load on the PF may be estimated based on engine operating conditions and inputs from engine sensors including the exhaust temperature sensor and the exhaust pressure sensor. If it is determined that the PF temperature is higher than a threshold PF temperature, the controller may estimate an amount of soot burned during the engine non-combusting condition. A rate of change of PF temperature during the engine non-combusting condition may be estimated either based on inputs from the exhaust temperature sensor or based on a temperature model. A rate of change of PF soot load during the engine non-combusting condition may be estimated based on each of the initial PF temperature, the rate of change of PF temperature, and the amount of oxygen flowing via the PF. The amount of soot burned during the engine non-combusting condition may be estimated based on the initial PF soot load, the rate of change of soot load, and the duration of the engine non-combusting condition. During an immediately subsequent engine restart, the amount of soot remaining on the PF may be updated based on the initial soot load on the PF and the amount of soot burned during the engine-off period.

In this way, by monitoring changes in soot load during an engine-off period, an accurate estimation of PF load may be obtained at the beginning of an immediately subsequent engine cycle. By modeling and/or measuring change in PF temperature during the engine-off period, an amount of soot burned during this period may be estimated. The technical effect of accurately estimating PF load at the beginning of a drive cycle is that PF regeneration may be scheduled without adversely affecting engine performance caused by undesired exhaust back pressures. By improving the scheduling for PF regeneration, engine conditions such as DFSO may be opportunistically carried out, thereby increasing fuel efficiency. Overall, by monitoring PF load during an engine-off period, PF soot removal during an immediately subsequent drive cycle may be effectively managed thereby improving emissions quality, and fuel economy.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
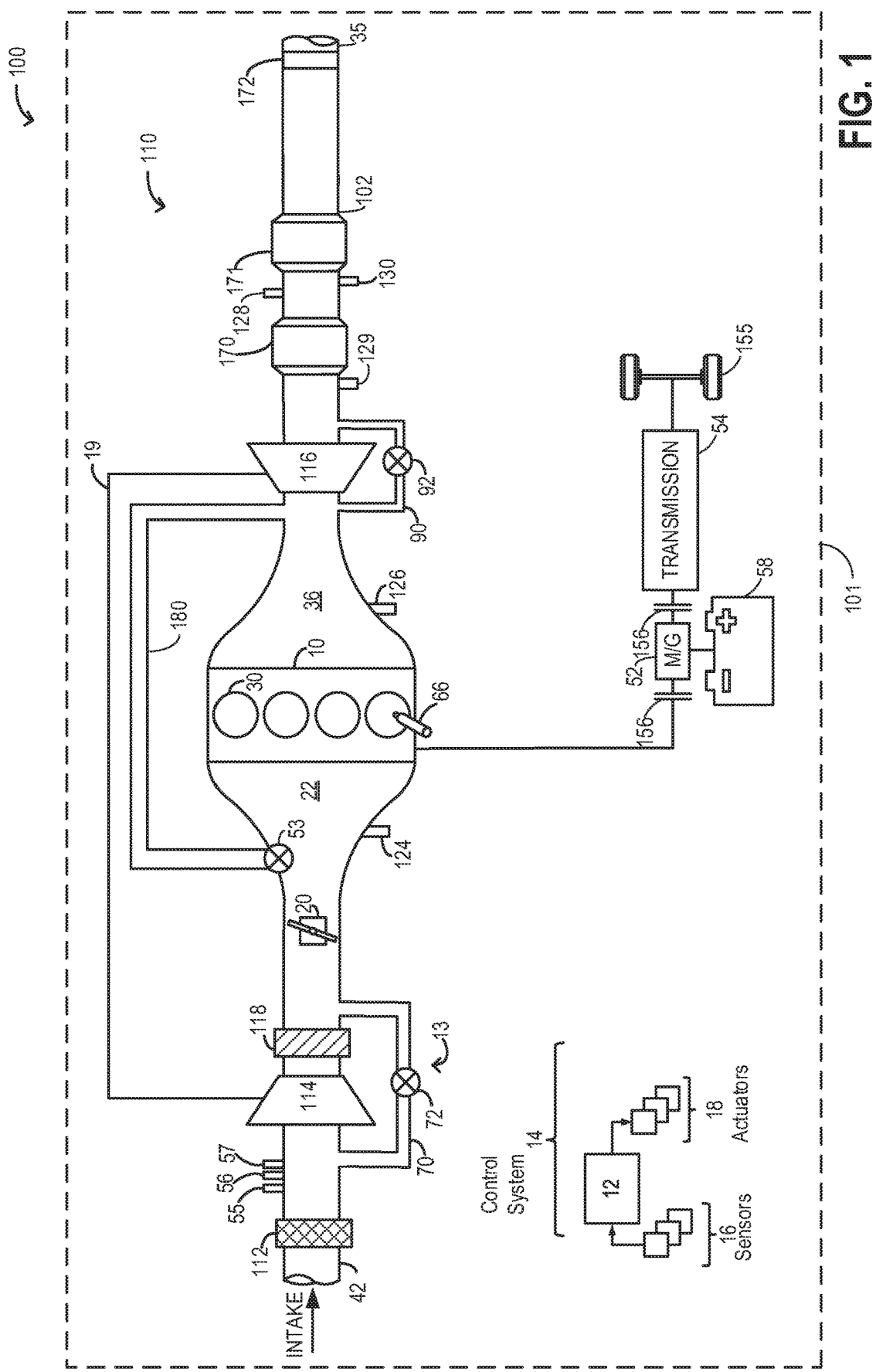
FIG. 1 shows an example embodiment of an engine system including an exhaust particulate filter (PF).

The following description relates to systems and methods for monitoring change in soot load accumulated on an exhaust particulate filter during an engine-off period. The PF may be coupled to an example engine system in a HEV as shown in FIG. 1. An engine controller may be configured to perform a control routine, such as the example routine of FIG. 2 to monitor a change in PF soot load during the engine-off period and then estimate a remaining PF soot load at the beginning of an immediately subsequent engine cycle. An example monitoring of the PF soot load is shown with reference to FIG. 3.

FIG. 1 shows a schematic view 100 of a vehicle system 101 with an example engine system 110 including an engine 10. In one example, the engine system 110 may be a diesel engine system. In another example, the engine system 110 may be a gasoline engine system. In the depicted embodiment, engine 10 is a boosted engine coupled to a turbocharger 13 including a compressor 114 driven by a turbine 116. Specifically, fresh air is introduced along intake passage 42 into engine 10 via intake air filter (air cleaner) 112 and flows to compressor 114. The compressor may be any suitable intake-air compressor, such as a motor-driven or driveshaft driven supercharger compressor. In engine system 10, the compressor is a turbocharger compressor mechanically coupled to turbine 116 via a shaft 19, the turbine 116 driven by expanding engine exhaust.

As shown in FIG. 1, compressor 114 is coupled through charge-air cooler (CAC) 118 to throttle valve 20. Throttle valve 20 is coupled to engine intake manifold 22. From the compressor, the compressed air charge flows through the charge-air cooler 118 and the throttle valve 20 to the intake manifold 11. In the embodiment shown in FIG. 1, the pressure of the air charge within the intake manifold 22 is sensed by manifold air pressure (MAP) sensor 124. A compressor recirculation passage 70 coupled in parallel with the intake compressor 114 to recirculate air via the compressor 114 based on engine boost demand. A compressor recirculation valve (CRV) 72 may be coupled to the compressor recirculation passage 70 to regulate air flow via the compressor recirculation passage 70.

One or more sensors may be coupled to an inlet of compressor 114. For example, a temperature sensor 55 may be coupled to the inlet for estimating a compressor inlet temperature, and a pressure sensor 56 may be coupled to the inlet for estimating a compressor inlet pressure. As another example, a humidity sensor 57 may be coupled to the inlet for estimating a humidity of aircharge entering the compressor. Still other sensors may include, for example, air-fuel ratio sensors, etc. In other examples, one or more of the compressor inlet conditions (such as humidity, temperature, pressure, etc.) may be inferred based on engine operating conditions. In addition, when exhaust gas recirculation (EGR) is enabled, the sensors may estimate a temperature, pressure, humidity, and air-fuel ratio of the aircharge mixture including fresh air, recirculated compressed air, and exhaust residuals received at the compressor inlet.

A wastegate actuator (valve) 92 may be actuated open to dump at least some exhaust pressure from upstream of the turbine to a location downstream of the turbine via wastegate 90. By reducing exhaust pressure upstream of the turbine, turbine speed can be reduced, which in turn helps to reduce compressor surge.

Intake manifold 22 is coupled to a series of combustion chambers 30 through a series of intake valves (not shown). The combustion chambers are further coupled to exhaust manifold 36 via a series of exhaust valves (not shown). In the depicted embodiment, a single exhaust manifold 36 is shown. However, in other embodiments, the exhaust manifold may include a plurality of exhaust manifold sections. Configurations having a plurality of exhaust manifold sections may enable effluent from different combustion chambers to be directed to different locations in the engine system.

In one embodiment, each of the exhaust and intake valves may be electronically actuated or controlled. In another embodiment, each of the exhaust and intake valves may be cam actuated or controlled. Whether electronically actuated or cam actuated, the timing of exhaust and intake valve opening and closure, and in some examples valve lift, may be adjusted as needed for desired combustion and emissions-control performance.

Combustion chambers 30 may be supplied with one or more fuels, such as gasoline, alcohol fuel blends, diesel, biodiesel, compressed natural gas, etc., via injector 66. Fuel may be supplied to the combustion chambers via direct injection, port injection, throttle valve-body injection, or any combination thereof. In the combustion chambers, combustion may be initiated via spark ignition and/or compression ignition.

Exhaust gas recirculation (EGR) delivery passage 180 may be coupled to the exhaust passage 102 upstream of turbine 116 to provide high pressure EGR (HP-EGR) to the engine intake manifold, downstream of compressor 114. An EGR valve 53 may be coupled to the HP-EGR passage 180 at the junction of the EGR passage 180 and the intake manifold 22. EGR valve 53 may be opened to admit a controlled amount of exhaust to the compressor outlet for desirable combustion and emissions control performance. EGR valve 53 may be configured as a continuously variable valve or as an on/off valve. In further embodiments, the engine system may include a low pressure EGR flow path wherein exhaust gas is drawn from downstream of turbine 116 and recirculated to the engine intake passage, upstream of compressor 114.

One or more sensors may be coupled to EGR passage 180 for providing details regarding the composition and condition of the HP-EGR. For example, a temperature sensor may be provided for determining a temperature of the EGR, a pressure sensor may be provided for determining a pressure of the EGR, a humidity sensor may be provided for determining a humidity or water content of the EGR, and an air-fuel ratio sensor may be provided for estimating an air-fuel ratio of the EGR. Alternatively, EGR conditions may be inferred by the one or more temperature, pressure, humidity, and air-fuel ratio sensors 55-57 coupled to the compressor inlet. In one example, air-fuel ratio sensor 57 is an oxygen sensor.

As shown in FIG. 1, exhaust from the one or more exhaust manifold sections may be directed to turbine 116 to drive the turbine. The combined flow from the turbine and the wastegate then flows through emission control device 170. In one example, the first emission control device 170 may be a light-off catalyst. In general, the exhaust after-treatment device 170 is configured to catalytically treat the exhaust flow, and thereby reduce an amount of one or more substances in the exhaust flow. For example, the exhaust after-treatment device 170 may be configured to trap $NO_x$ from the exhaust flow when the exhaust flow is lean, and to reduce the trapped $NO_x$ when the exhaust flow is rich. In other examples, the exhaust after-treatment device 170 may be configured to disproportionate $NO_x$ or to selectively reduce $NO_x$ with the aid of a reducing agent. In still other examples, the exhaust after-treatment device 170 may be configured to oxidize residual hydrocarbons and/or carbon monoxide in the exhaust flow. Different exhaust after-treatment catalysts having any such functionality may be arranged in wash coats or elsewhere in the exhaust after-treatment stages, either separately or together.

A particulate filter (PF) 171 is shown arranged along the exhaust passage 102 downstream of the exhaust after-treatment device 170. The particulate filter 171 may be a gasoline particulate filter or a diesel particulate filter. A substrate of the particulate filter 171 may be made of ceramic, silicon, metal, paper, or combinations thereof. During operation of the engine 10, particulate filter 171 may capture exhaust particulate matter (PMs), such as ash and soot (e.g., from unburned hydrocarbons) in order to reduce vehicle emissions. The soot may accumulate on the surfaces of the particulate filter thereby creating an exhaust backpressure. The exhaust backpressure may negatively influence the engine efficiency. In order to avoid high backpressure, when the PF soot loading reaches a threshold load, the engine 10 may opportunistically regenerate the PF during a higher than threshold exhaust temperature and a leaner than stoichiometric air fuel ratio condition.

A pressure sensor 130 may be coupled to the exhaust passage 102 upstream of the particulate filter 171 to estimate exhaust pressure. The controller may estimate the soot loading on the exhaust based on the exhaust pressure estimated via the sensor 130. A plurality of sensors, including an exhaust temperature sensor 128 and an exhaust oxygen sensor 129 may be coupled to the exhaust passage 102. The oxygen sensor may be linear oxygen sensors or UEGO (universal or wide-range exhaust gas oxygen), two-state oxygen sensors or EGO, HEGO (heated EGO), a NOx, HC, or CO sensors. From downstream of the PF 171, exhaust may be released to the atmosphere via the muffler 172 and the tailpipe 35.

If the PF temperature immediately prior to an engine shutdown is higher than a threshold temperature, in presence of ambient air (supplying oxygen), a portion of the soot deposited on the PF 171 may be oxidized during the engine shutdown period. Therefore, the PF load estimated immediately prior to an engine shutdown may be different from an actual PF load at the onset of an immediately subsequent engine restart. Estimating soot loading of the PF during the engine shutdown period may include estimating a rate of soot burn as a function of on one or more of the temperature of the PF at shutdown, the corresponding temperature profile of the PF during the engine shutdown period, the initial soot loading of the PF immediately prior to the engine shutdown, and an amount of oxygen flowing via the PF during the engine shutdown period. The temperature profile of the PF during the engine shutdown period may be based on an estimated rate of change of PF temperature (based on inputs from an exhaust temperature sensor) or a modeled rate of change of PF temperature, the temperature model based on one or more of the temperature of the PF at shutdown and an ambient temperature. The amount of soot burned during the engine shutdown period may then be estimated based on each of the rate of soot burn and the initial soot loading of the PF immediately prior to the engine shutdown. During an immediately subsequent engine start, an updated soot loading of the PF may be estimated based on the initial soot loading of the PF immediately prior to the engine shutdown and the amount of soot burned during the engine shutdown period. Also, after the immediately subsequent engine start, PF regeneration may be accurately scheduled based on the updated soot loading of the PF and independent of the initial soot loading of the PF immediately prior to the engine shutdown. By scheduling PF regeneration based on the updated PF soot loading, emissions quality may be improved and engine operating conditions such as deceleration fuel shut-off (DFSO) events may be optimized, thereby improving fuel efficiency benefits.

Engine system 110 may further include control system 14. Control system 14 is shown receiving information from a plurality of sensors 16 (various examples of which are described herein) and sending control signals to a plurality of actuators 18 (various examples of which are described herein). As one example, sensors 16 may include exhaust gas sensor 126 located upstream of the turbine 116, MAP sensor 124, exhaust temperature sensor 128, exhaust oxygen sensor 129, exhaust pressure sensor 130, compressor inlet temperature sensor 55, compressor inlet pressure sensor 56, compressor inlet humidity sensor 57, and EGR sensor. Other sensors such as additional pressure, temperature, air/fuel ratio, and composition sensors may be coupled to various locations in engine system 110. The actuators 18 may include, for example, throttle 20, EGR valve 53, wastegate valve 92, CRV 72, and fuel injector 66. The control system 14 may include a controller 12. The controller 12 may receive input data from the various sensors, process the input data, and trigger various actuators in response to the processed input data based on instruction or code programmed therein corresponding to one or more routines. For example, immediately prior to an engine-off condition, the controller may estimate PF temperature via the exhaust temperature sensor 128 and PF soot load via the pressure sensor 130, and in response to a higher than threshold PF temperature, the controller may compute a rate of change of PF temperature and a rate of change of PF soot load during the engine-off period. In another example, at the onset of a drive cycle immediately following the engine-off period, the controller may estimate the PF soot load based on the change of PF soot load during the engine-off period and then schedule PF regeneration based on the estimated soot load at the onset of a drive cycle.

In some examples, vehicle 101 may be a hybrid vehicle with multiple sources of torque available to one or more vehicle wheels 155. In other examples, vehicle 101 is a conventional vehicle with only an engine, or an electric vehicle with only electric machine(s). In the example shown, vehicle 101 includes engine 10 and an electric machine 52. Electric machine 52 may be a motor or a motor/generator. Crankshaft 40 of engine 10 and electric machine 52 are connected via a transmission 54 to vehicle wheels 155 when one or more clutches 156 are engaged. In the depicted example, a first clutch 156 is provided between crankshaft 40 and electric machine 52, and a second clutch 156 is provided between electric machine 52 and transmission 54. Controller 12 may send a signal to an actuator of each clutch 156 to engage or disengage the clutch, so as to connect or disconnect crankshaft 40 from electric machine 52 and the components connected thereto, and/or connect or disconnect electric machine 52 from transmission 54 and the components connected thereto. Transmission 54 may be a gearbox, a planetary gear system, or another type of transmission. The powertrain may be configured in various manners including as a parallel, a series, or a series-parallel hybrid vehicle.

Electric machine 52 receives electrical power from a traction battery 58 to provide torque to vehicle wheels 155. Electric machine 52 may also be operated as a generator to provide electrical power to charge traction battery 58, for example during a braking operation.

In this way, the system of FIG. 1 enables a system for a hybrid vehicle comprising: hybrid vehicle system, comprising: an engine including one or more engine cylinders, an electric machine coupled to a battery, one or more fuel injectors coupled to the one or more engine cylinders, an engine intake manifold, an engine exhaust manifold including an exhaust passage, each of a particulate filter, an exhaust pressure sensor, an exhaust temperature sensor, and an exhaust oxygen sensor coupled to the exhaust passage. The engine further comprising a controller with computer readable instructions stored on non-transitory memory for:

estimating a PF temperature immediately prior to an engine shutdown via the exhaust temperature sensor, estimating an amount of soot accumulated on the PF immediately prior to an engine shutdown via the exhaust pressure sensor, in response to the estimated PF temperature being higher than a threshold temperature, monitoring an amount of soot burned during an engine non-combusting condition based on a change in PF temperature, and regenerating the PF during an immediately subsequent engine combusting condition based on the amount of soot accumulated on the PF during engine operation which is offset by the amount of soot burned during the non-combusting condition.

Figure 2:
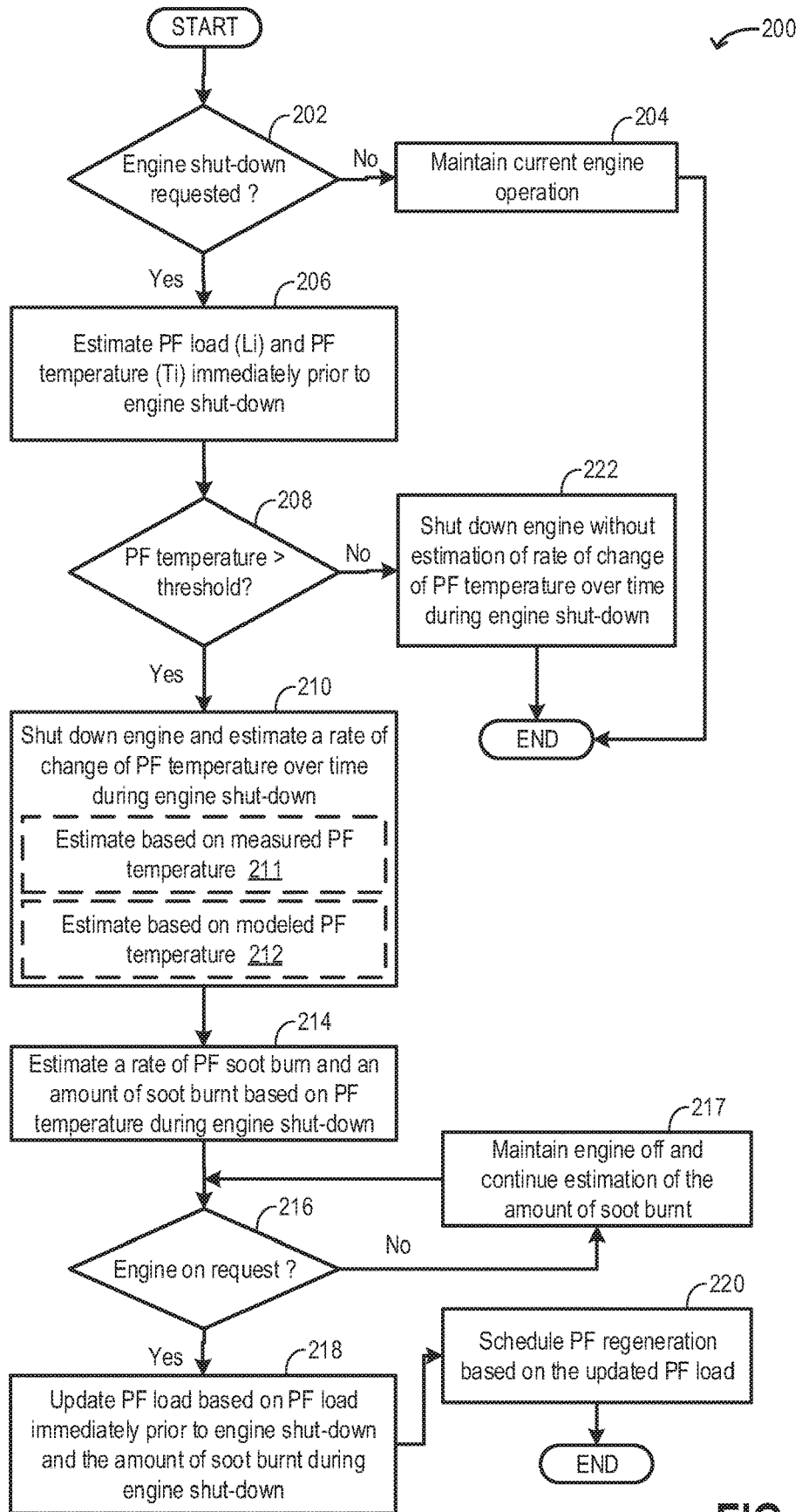
FIG. 2 shows a flow chart illustrating an example method that may be implemented for monitoring a change in PF soot load during an engine non-combusting condition.

FIG. 2 illustrates an example method 200 that may be implemented for monitoring a change in soot load accumulated on a particulate filter (such as PF 171 of FIG. 1) coupled to an engine exhaust passage during an engine-off period. Instructions for carrying out method 200 and the rest of the methods included herein may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the methods described below.

At 202, the routine includes determining if an engine shutdown has been requested. In one example, an engine shutdown may be requested responsive to a vehicle shutdown event when the vehicle is no longer propelled. In another example, in a hybrid vehicle, during a lower than threshold engine load condition, the vehicle may be propelled via motor torque and combustion in the engine may be suspended. The threshold engine load at which engine shutdown may be requested may be dynamically calibrated by the controller based on the state of charge (SOC) of the electric motor battery (such as battery 58 in FIG. 1), auxiliary power demand such as for operation of an air-conditioning system, and road gradient information. As an example, the threshold engine load at which the engine may be shutdown may increase with one or more of an increase in the battery SOC, a decrease in auxiliary power demand, and a decrease in road gradient (such as during downhill travel).

If it is determined that engine shutdown is not requested, at 204, current engine operations may be maintained and the vehicle may be propelled using engine torque. If it is determined that an engine shutdown is requested, at 206, immediately prior to engine shutdown, the controller may determine particulate filter temperature (referred herein as the initial PF temperature, $T_i$) and a load of soot accumulated on the PF (referred herein as the initial PF soot load, $L_i$). The controller may determine the initial PF temperature based on an exhaust temperature as estimated via an exhaust temperature sensor (such as exhaust temperature sensor 128 in FIG. 1) coupled to the exhaust passage. As an example, the controller may determine the PF temperature based on a calculation using a look-up table with the input being exhaust temperature, and the output being PF temperature. The controller may determine the PF soot load based on one or more of exhaust pressure as estimated via an exhaust pressure sensor (such as pressure sensor 130 in FIG. 1) coupled to the exhaust passage upstream of the PF, exhaust temperature, engine load as estimated based on an accelerator pedal position sensor, engine speed as estimated via a crankshaft acceleration sensor, and time elapsed since an immediately previous PF regeneration. As an example, the controller may determine the PF load based on a calculation using a look-up table with the input being exhaust pressure, exhaust temperature, engine, load, engine speed, and time elapsed since an immediately previous PF regeneration, and the output being PF load.

At 208, the routine includes determining if the PF temperature immediately prior to engine shutdown is higher than a threshold temperature. The threshold temperature may correspond to a temperature at which, in presence of a desired amount of oxygen, soot deposited on the PF may be oxidized (burned). In one example, the threshold PF temperature may be 650° C. During engine-off conditions, ambient air with oxygen flows through the PF and if the PF temperature is higher than the threshold temperature, even if hot exhaust may not flow through the PF during the non-combusting engine condition, at least a portion of soot deposited on the PF may be burned (i.e., oxidized).

If it is determined that the PF temperature immediately prior to engine shutdown is lower than the threshold temperature, it may be inferred that due to the lower than threshold PF temperature, soot deposited on the PF may not burn. Therefore, there may not be any appreciable change in the amount of soot deposited on the PF during the engine non-combusting condition. At 222, the engine may be shut down without estimation of a rate of change of PF temperature over time during the engine shutdown period. In order to suspend combustion (shutdown the engine) the controller may send a signal to the fuel injectors coupled to the engine cylinders to discontinue fuel injection. Also, the controller may send a signal to the spark plugs coupled to the engine cylinders to deactivate spark.

If it is determined that the PF temperature immediately prior to engine shutdown is higher than the threshold temperature, it may be inferred that due to the higher than threshold PF temperature, soot deposited on the PF may burn and there may be appreciable changes in the amount of soot deposited on the PF during the engine non-combusting condition. At 210, the engine may be shut down and a rate of change of PF temperature over time during the engine shutdown period may be estimated. During the non-combusting engine condition, there may not be a flow of hot exhaust gas, however, the exhaust manifold having a substantial thermal mass, the temperature of exhaust system components including the PF may continue to be higher for a duration after engine shutdown. Over the duration of engine shutdown, in the absence of engine thermal output, the PF temperature may continue to change (decrease) and the change in the PF temperature may influence the amount of soot (accumulated on the PF) burned. In one example, the rate of change of PF temperature may vary over time with a higher rate of change of PF temperature immediately after the shutdown with the rate decreasing as the PF temperature decreases. In another example, the PF temperature may change at a constant rate over the duration of the engine non-combusting condition. Also, the rate of change of PF temperature may be based on ambient temperature, the rate of change of PF temperature increasing with a decrease in ambient temperature and the rate of change of PF temperature decreasing with an increase in ambient temperature. As an example, the PF temperature may decrease at a faster rate if the ambient temperature is lower (such as when it is snowing) and the PF temperature may decrease at a slower rate if the ambient temperature is higher (such as during a hot summer day).

Estimating the rate of change of PF temperature may include, at 211, estimating the rate of change of PF temperature based on a measured PF temperature. Throughout the duration of the engine non-combusting condition, the PF temperature may be measured based on inputs from the exhaust temperature sensor coupled to the exhaust passage upstream of the PF, at regular intervals. The rate of change of PF temperature may be estimated as based on the PF temperature measured at regular intervals and the duration between two successive measurements. In one example, the rate of change of PF temperature may be estimated via equation 1.

$$\frac{dT}{dt} = \frac{T_1 - T_2}{t_2 - t_1} \quad (1)$$

Where, $$\frac{dT}{dt}$$

is the rate of change of PF temperature, $T_1$ is the PF temperature measured via the exhaust temperature sensor at time $t_1$, and $T_2$ is the PF temperature measured via the exhaust temperature sensor at time $t_2$.

Estimating the rate of change of PF temperature may also include, at 212, estimating the rate of change of PF temperature based on a modeled PF temperature. The temperature model may be based on one or more of the higher than threshold PF temperature estimated immediately prior to engine shutdown and an ambient temperature. In one example, the rate of change of PF temperature may be estimated via equation 2.

$$\frac{dT}{dt} = f(T_i, T_a, t) \quad (2)$$

Where, $$\frac{dT}{dt}$$

is the rate or change or PF temperature, $T_i$ is the initial PF temperature as estimated immediately prior to engine shutdown, $T_a$ is the ambient air temperature as estimated via an intake temperature sensor (such as temperature sensor 55 in FIG. 1), and t is time.

At 214, the controller may estimate a rate of PF soot burn during the engine non-combusting condition. The rate of PF soot burn may be a function of the higher than threshold initial PF temperature estimated immediately prior to engine shutdown, the estimated rate of change of PF temperature, and an amount of oxygen flowing via the PF when the engine is no longer combusting. The amount of oxygen flowing via the PF may remain substantially equal to the oxygen content of ambient air during the duration of engine shutdown. The rate of PF soot burn may be directly proportional to the initial PF temperature. In one example, the rate of soot burn may increase with an increase in one or more of the higher than threshold initial PF temperature and the amount of oxygen flowing via the PF and a decrease in the rate of change of PF temperature. In another example, the rate of soot burn may decrease with a decrease in one or more of the higher than threshold initial PF temperature and the amount of oxygen flowing via the PF and an increase in the rate of change of PF temperature. The controller may determine the rate of soot burn based on a calculation using a look-up table with the input being exhaust temperature, initial PF temperature, the rate of change of PF temperature, and the amount of oxygen flowing via the PF and the output being the rate of soot burn. The PF soot burn may continue until the PF temperature reduces to below the threshold PF temperature and the soot may no longer be oxidized at the lower than threshold PF temperature.

The controller may also estimate an amount of soot burned during the engine non-combusting condition based on the initial PF soot load and the rate of PF soot burn. The amount of soot burned may also be based on a time elapsed since engine-off during which the PF temperature has been higher than the threshold PF temperature and oxygen flow via the PF is maintained. The amount of PF soot burned may be directly proportional to the initial PF soot load, the rate of PF soot burn, the amount of oxygen flowing via the PF, and the duration of the time elapsed since engine-off when the PF temperature has been higher than the threshold PF temperature. In one example, the amount of soot burned may increase with an increase in one or more of the initial PF soot load, the rate of PF soot burned, the amount of oxygen flowing via the PF, and the duration of time when the PF temperature has been higher than the threshold PF temperature. In another example, the amount of soot burned may decrease with a decrease in one or more of the initial PF soot load, the rate of PF soot burn, the amount of oxygen flowing via the PF, and the duration of time when the PF temperature has been higher than the threshold PF temperature. The controller may determine the amount of soot burned during the non-combusting period based on a calculation using a look-up table with the input being the initial PF soot load, the rate of PF soot burn, the amount of oxygen flowing via the PF, and the duration of time when the PF temperature has been higher than the threshold PF temperature and the output being the amount of soot burned.

The controller may update the PF temperature over the duration of the engine shutdown based on the initial PF temperature and the rate of change of PF temperature. The estimation of the amount of soot burned during the duration of the engine shutdown may be carried out until the updated PF temperature decreases below the threshold PF temperature. Once the PF temperature reduces to below the threshold temperature, soot may no longer burn and the soot load on the PF may remain substantially constant for the remaining duration of the engine shutdown period.

AT 216, the routine includes determining if an engine-on request has been made. In one example, the engine may be restarted in response to a vehicle key-on event when the vehicle is propelled at least partially using engine torque. In another example, for a hybrid vehicle, the engine may be restarted in response to an increase in engine torque demand or an increase in auxiliary power demand (such as air conditioning system activated) when the battery SOC of the electric motor may not be sufficient to operate the vehicle. If it is determined that an engine-on request has not been made, at 217, the engine may be maintained in the off condition (non-combusting) and the amount of soot burned during the non-combusting period may be continued to be estimated.

If it is determined that engine restart has been requested, at 218, the PF soot load may be updated based on the initial PF soot load as estimated immediately prior to engine shutdown and the amount of soot burned during engine shutdown. In one example, the updated PF soot load may be given by equation 3.

$$L_f = L_i - L_b \quad (3)$$

Where, $L_f$ is the updated (final) PF soot load at the end of the engine-off period, $L_i$ is the initial PF soot load immediately prior to engine shutdown, and $L_b$ is the amount of soot burned during engine non-combusting period. The controller may send a signal to the starter motor to crank the engine in response to the restart request. Also, the controller may send signals to the fuel injectors and the spark plugs to resume fueling and spark as the engine is restarted.

At 220, the controller may schedule opportunistic regeneration of the PF based on the updated PF load. Passive regeneration may occur during higher load engine operations when the PF temperature increases beyond the threshold temperature (e.g., 650° C.), where the soot on the particulate filter may combust. During certain engine operating conditions, such as during vehicle deceleration or braking, fuel injection to all or some of the engine cylinders may be temporarily suspended. During such an operation, known as a deceleration fuel shut-off (DFSO) event, combustion in the unfueled engine cylinders may be suspended and a higher amount of air (oxygen) may flow through the exhaust PF. When a DFSO event occurs at higher than threshold PF temperature, the oxygen flowing through the PF may be opportunistically used to passively regenerate the PF. During conditions when the soot load on the PF exceeds the threshold soot load and conditions for passive regeneration are not available, the PF may need to be actively regenerated to improve exhaust emissions. Active regeneration may occur via the controller signaling for alterations to engine operations in order to actively increase PF temperature to the threshold temperature independent of the engine load. In one example, this may be achieved by retarding spark timing from maximum brake torque (MBT).

By monitoring change in PF soot load during the engine non-combusting condition, an accurate estimate of PF soot load may be available at engine restart. By accurately estimating PF load at the onset of a drive cycle, PF regeneration may be accurately scheduled. By improving the scheduling for PF regeneration, engine conditions such as DFSO may be opportunistically carried out, thereby increasing fuel efficiency.

In this way, each of a first soot load on an exhaust particulate filter (PF) and a first PF temperature may be estimated immediately prior to an engine shutdown, and responsive to the first PF temperature being higher than a threshold PF temperature, an amount of soot burned during a duration of the engine shutdown may be estimated based on the first PF temperature, and a second soot load on the PF may be estimated based on the amount of soot burned. During a subsequent combustion event, PF regeneration may be scheduled based on the second soot load. Estimation of the PF temperature during the non-combusting condition is continued until the PF temperature reduces below the threshold temperature, and then the controller may suspend monitoring of the amount of soot burned during the engine non-combusting condition in response to the PF temperature reducing below the threshold temperature.

Figure 3:
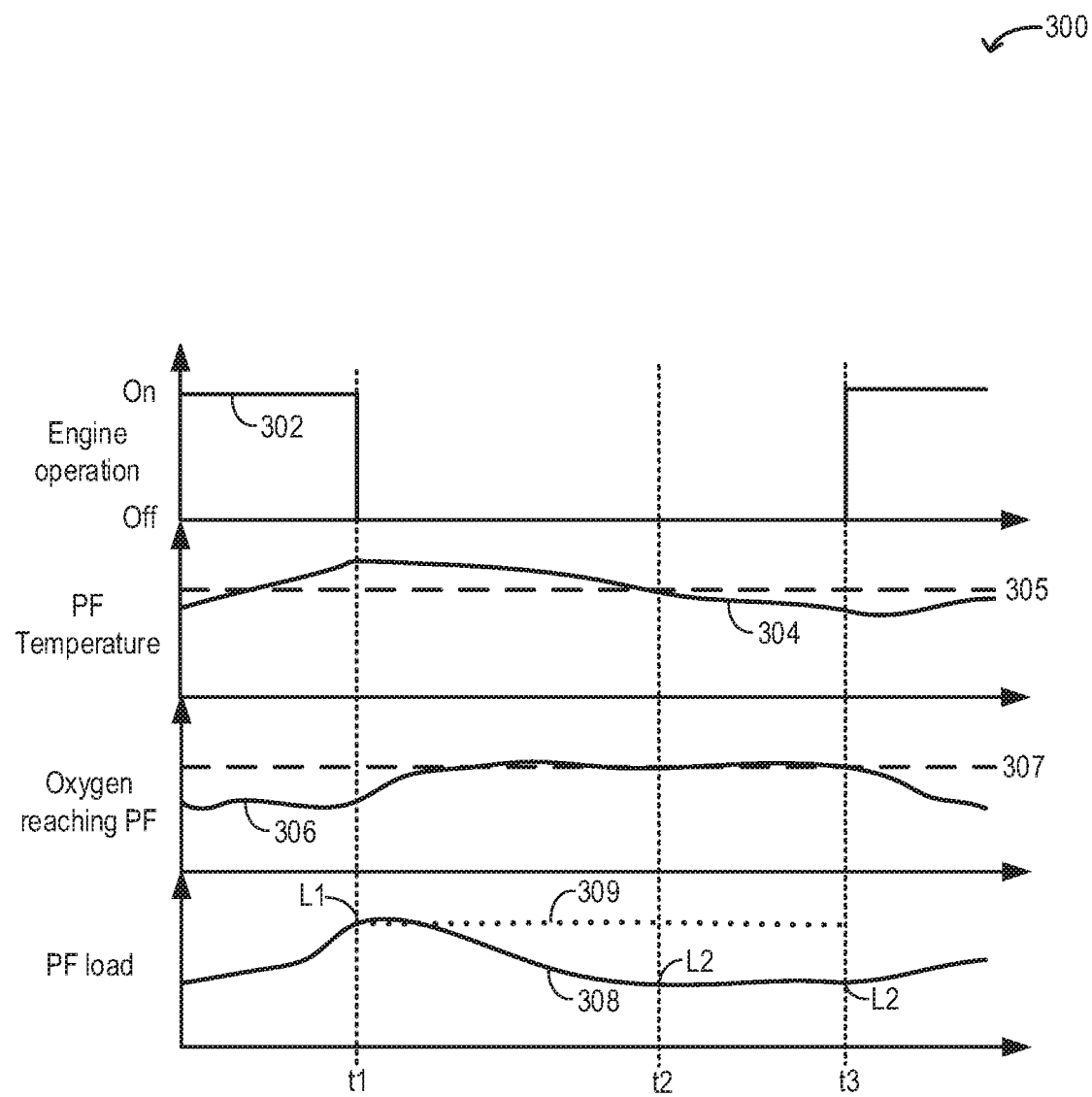
FIG. 3 shows an example monitoring of the PF soot load, according to the present disclosure.

FIG. 3 shows an example operating sequence 300 illustrating an example monitoring of soot load on an exhaust particulate filter (PF) during an engine non-combusting condition. The horizontal (x-axis) denotes time and the vertical markers t1-t3 identify significant times in PF soot load monitoring.

The first plot, line 302, shows engine operation. The second plot, line 304, shows variation in PF temperature over time. The PF temperature is estimated based on inputs from an exhaust temperature sensor coupled to the exhaust passage upstream of the PF. Dashed line 305 denotes a threshold PF temperature above which the soot deposited on the PF may be oxidized (burned) in the presence of oxygen. The third plot, line 306 shows an amount of oxygen reaching the PF. Dashed line 307 denotes a level of oxygen present in ambient air. The fourth plot, line 308, shows an amount of soot accumulated on the PF.

Prior to time t1, the engine is operational and engine torque is used to propel the vehicle. As combustion continues, the soot load on the PF increases and also the PF temperature steadily increases. The controller estimates PF soot load based on engine operating conditions including exhaust pressure, exhaust temperature, engine load, etc. and further based on a time elapsed since an immediately previous PF regeneration event. As a portion of oxygen from ambient air is used during engine combustion, the amount of oxygen reaching the PF is lower than the level of oxygen present in ambient air. Due to the lower oxygen content of exhaust gas reaching the PF, even when the PF temperature increases to above the threshold PF temperature 305, the soot deposited on the PF is not burned. In one example, the threshold PF temperature may be empirically determined based on a thermal energy used for burning soot deposited on the PF.

At time t1, the controller shuts down the engine by deactivating fueling and spark. Due to the PF temperature immediately prior to the shutdown being higher than the threshold temperature, it is inferred that PF soot may be burned during the engine non-combusting period. Between time t1 and t2, the change (decrease) in PF temperature is monitored based on inputs from the exhaust temperature sensor. During this time, since oxygen is not being utilized for engine combustion, the amount of oxygen reaching the PF is substantially equal to the amount of oxygen in the ambient air, thereby facilitating oxidation of soot deposited on the PF. The controller estimates a rate of PF soot burn based on the PF soot load (L1) at time t1 and the rate of change in PF temperature between time t1 and t2. Due to the higher than threshold PF temperature and the desired oxygen level, the soot continues to burn and the amount of soot deposited on the PF consistently reduces.

At time t2, in response to the PF temperature decreasing to below the threshold temperature 305, it is inferred that soot deposited on the PF may not burn any further until the PF temperature increases to above the threshold. The PF soot load at time t2 is denoted by L2. Between time t2 and t3, the PF temperature continues to decrease, the oxygen level remains substantially equal to the ambient oxygen level, and the PF level remains substantially constant at L2.

At time t3, in response to engine torque demand, the controller restarts the engine by cranking the engine via a starter motor and resuming fueling and spark to the engine cylinders. The PF soot load at time t3 is L2 and after time t3, the controller opportunistically schedules PF regeneration based on the PF soot level L2. However, if the change in soot level during the engine non-combusting phase (between time t1 and t3) had not been monitored, upon engine restart at time t3, as shown by dotted line 309, the controller may have inferred the PF soot load has remained at L1 during the engine shutdown period. By making an erroneous estimation of soot load at engine restart, the subsequent PF regeneration may not have been accurately scheduled. Regeneration may have been initiated too early because the soot load L1 was higher than actual thereby adversely effecting fuel economy. Also, the erroneous estimation of soot load at engine restart may have resulted in erroneous estimation of engine back pressure, thereby adversely affecting engine operating parameters.

In this way, by monitoring an amount of soot burned during an engine non-combusting condition, the soot load deposited on the exhaust particulate filter at the beginning of an immediately subsequent drive cycle may be estimated with improved accuracy. By modeling a rate of change of PF temperature over the duration of the engine non-combusting condition, the amount of soot burned may be accurately estimated. The technical effect of accurately estimating PF load at the beginning of a drive cycle is that PF regeneration may be scheduled without adversely affecting fuel benefiting conditions such as a deceleration fuel shut-off (DFSO) event. Overall, by monitoring PF load during an engine-off period, PF soot removal during an immediately subsequent drive cycle may be effectively scheduled, thereby improving emissions quality, engine performance, and fuel economy.

An example method comprises: estimating soot loading of a particulate filter (PF), coupled to an exhaust of an engine, during an engine shutdown period to account for soot oxidation during the engine shut down period based on a temperature of the PF at shutdown and a corresponding temperature profile of the PF during the engine shutdown period. In any preceding example, the method further comprises, additionally or optionally, estimating an initial soot loading of the PF immediately prior to engine shutdown based on one or more of exhaust pressure, exhaust temperature, engine load, engine speed, and time elapsed since an immediately previous PF regeneration. In any or all of the preceding examples, additionally or optionally, wherein estimating soot loading of the PF during the engine shutdown period includes, estimating a rate of soot burn as a function of on one or more of the temperature of the PF at shutdown, the corresponding temperature profile of the PF during the engine shutdown period, the initial soot loading of the PF immediately prior to the engine shutdown, and an amount of oxygen flowing via the PF during the engine shutdown period. In any or all of the preceding examples, the method further comprises, additionally or optionally, estimating an amount of soot burned during the engine shutdown period based on each of the rate of soot burn and the initial soot loading of the PF immediately prior to the engine shutdown. In any or all of the preceding examples, additionally or optionally, the temperature profile of the PF during the engine shutdown period is based on a rate of change of PF temperature as estimated via an exhaust temperature sensor. In any or all of the preceding examples, additionally or optionally, the temperature profile of the PF during the engine shutdown period is based on the rate of change of PF temperature as estimated based on a temperature model, the temperature model based on one or more of the temperature of the PF at shutdown and an ambient temperature. In any or all of the preceding examples, additionally or optionally, the rate of soot burn increases with an increase in one or more of the temperature of the PF at shutdown, the amount of oxygen flowing via the PF, the initial soot loading of the PF immediately prior to the engine shutdown, and the rate of change of PF temperature, and wherein the amount of soot burned increases with an increase in one or more of the rate of soot burn and the initial soot loading of the PF immediately prior to the engine shutdown. In any or all of the preceding examples, the method further comprises, additionally or optionally, during an immediately subsequent engine start, estimating an updated soot loading of the PF based on the initial soot loading of the PF immediately prior to the engine shutdown and the amount of soot burned during the engine shutdown period. In any of the preceding examples, the method further comprises, additionally or optionally, after the immediately subsequent engine start, scheduling PF regeneration based on the updated soot loading of the PF, independent of the initial soot loading of the PF immediately prior to the engine shutdown.

Another example method comprises: estimating each of a first soot load on an exhaust particulate filter (PF) and a first PF temperature immediately prior to an engine shutdown; responsive to the first PF temperature being higher than a threshold PF temperature, estimating an amount of soot burned during a duration of the engine shutdown based on the first PF temperature, and estimating a second soot load on the PF based on the amount of soot burned, and during a subsequent combustion event, scheduling PF regeneration based on the second soot load. In any preceding example, additionally or optionally, estimating the amount of soot burned during the duration of the engine shut down based on the first PF temperature includes estimating a rate of change of soot load on the PF based on the first PF temperature, the first soot load on the PF, a rate of change of PF temperature over the duration of the engine shutdown, and an amount of oxygen flowing via the PF over the duration of the engine shutdown, and then estimating the amount of soot burned based on the rate of change of soot load on the PF, the first soot load on the PF, and the duration of the engine shutdown. In any or all of the preceding examples, additionally or optionally, the amount of soot burned during the duration of the engine shut down increases with an increase in one or more of the first soot load on the PF, the amount of oxygen flowing via the PF, the rate of change of soot load on the PF, and the duration of the engine shutdown. In any or all of the preceding examples, additionally or optionally, the rate of change of PF temperature over the duration of the engine shutdown is estimated as a function of the first PF temperature, an ambient temperature, and time. In any or all of the preceding examples, additionally or optionally, estimating the second soot load on the PF based the amount of soot burned includes estimating the second soot load on the PF as a function of the first soot load on the PF and the amount of soot burned during the duration of the engine shutdown. In any or all of the preceding examples, the method further comprises, additionally or optionally, updating a PF temperature over the duration of the engine shutdown based on the first PF temperature and the rate of change of PF temperature and continuing estimation of the amount of soot burned during the duration of the engine shutdown until the updated PF temperature decreases below the threshold PF temperature. In any or all of the preceding examples, additionally or optionally, the first PF temperature is estimated based on input from an exhaust temperature sensor, and wherein the first soot load on the PF is estimated as a function of one or more of exhaust pressure as estimated via an exhaust pressure sensor, exhaust temperature as estimated via the exhaust temperature sensor, and time elapsed since an immediately previous PF regeneration. In any or all of the preceding examples, additionally or optionally, wherein the first soot load on the PF is higher than the second soot load on the PF.

In yet another example, a hybrid vehicle system comprises: an engine including one or more engine cylinders, an electric machine coupled to a battery, one or more fuel injectors coupled to the one or more engine cylinders, an engine intake manifold, an engine exhaust manifold including an exhaust passage, each of a particulate filter, an exhaust pressure sensor, an exhaust temperature sensor, and an exhaust oxygen sensor coupled to the exhaust passage, and a controller with computer readable instructions stored on non-transitory memory for: estimating a PF temperature immediately prior to an engine shutdown via the exhaust temperature sensor, estimating an amount of soot accumulated on the PF immediately prior to an engine shutdown via the exhaust pressure sensor, in response to the estimated PF temperature being higher than a threshold temperature, monitoring an amount of soot burned during an engine non-combusting condition based on a change in PF temperature, and regenerating the PF during an immediately subsequent engine combusting condition based on the amount of soot accumulated on the PF during engine operation which is offset by the amount of soot burned during the non-combusting condition. In any preceding example, additionally or optionally, monitoring the amount of soot burned during the engine non-combusting condition includes updating the PF temperature during the non-combusting condition based on inputs from the exhaust temperature sensor and then estimating the amount of soot burned based on the updated PF temperature and an amount of oxygen flowing via the PF. In any or all of the preceding examples, additionally or optionally, the updating the PF temperature during the non-combusting condition is continued until the PF temperature reduces below the threshold temperature, the controller containing further instructions for suspending monitoring of the amount of soot burned during the engine non-combusting condition in response to the PF temperature reducing below the threshold temperature.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
estimating, via a controller, each of a first soot load on an exhaust particulate filter (PF) and a first PF temperature immediately prior to an engine shutdown;
shutting down an engine via the controller;
responsive to the first PF temperature being higher than a threshold PF temperature, estimating, via the controller, an amount of soot burned during a duration of the engine shutdown based on the first PF temperature, and estimating a second soot load on the PF based on the amount of soot burned;
restarting the engine from shutdown via the controller; and then
during a subsequent combustion event subsequent to the shutdown, scheduling PF regeneration based on the second soot load via the controller.

2. The method of claim 1, wherein estimating the amount of soot burned during the duration of the engine shutdown based on the first PF temperature includes estimating a rate of change of soot load on the PF based on the first PF temperature, the first soot load on the PF, a rate of change of PF temperature over the duration of the engine shutdown, and an amount of oxygen flowing via the PF over the duration of the engine shutdown, and then estimating the amount of soot burned based on the rate of change of soot load on the PF, the first soot load on the PF, and the duration of the engine shutdown.

3. The method of claim 2, wherein the amount of soot burned during the duration of the engine shutdown increases with an increase in one or more of the first soot load on the PF, the amount of oxygen flowing via the PF, the rate of change of soot load on the PF, and the duration of the engine shutdown.

4. The method of claim 2, wherein the rate of change of PF temperature over the duration of the engine shutdown is estimated as a function of the first PF temperature, ambient temperature, and time.

5. The method of claim 2, further comprising updating a PF temperature over the duration of the engine shutdown based on the first PF temperature and the rate of change of PF temperature and continuing estimation of the amount of soot burned during the duration of the engine shutdown until the updated PF temperature decreases below the threshold PF temperature.

6. The method of claim 1, wherein estimating the second soot load on the PF based the amount of soot burned includes estimating the second soot load on the PF as a function of the first soot load on the PF and the amount of soot burned during the duration of the engine shutdown.

7. The method of claim 1, wherein the first PF temperature is estimated based on input from an exhaust temperature sensor, and wherein the first soot load on the PF is estimated as a function of one or more of exhaust pressure as estimated via an exhaust pressure sensor, exhaust temperature as estimated via the exhaust temperature sensor, and time elapsed since an immediately previous PF regeneration.

8. The method of claim 1, wherein the first soot load on the PF is higher than the second soot load on the PF.

* * * * *